(12) United States Patent
Kimura et al.

(10) Patent No.: US 9,737,850 B2
(45) Date of Patent: Aug. 22, 2017

(54) EXHAUST GAS PURIFICATION PALLADIUM MONOLAYER CATALYST FOR SADDLE-RIDING-TYPE VEHICLE

(75) Inventors: Toshiaki Kimura, Wako (JP); Hiroyuki Horimura, Wako (JP); Akiko Koga, Wako (JP); Motoki Ito, Wako (JP); Masateru Tsuji, Wako (JP); Takashi Wakabayashi, Ageo (JP); Yosuke Shibata, Ageo (JP); Yunosuke Nakahara, Ageo (JP); Kiyotaka Yasuda, Ageo (JP)

(73) Assignees: Honda Motor Co., Ltd., Tokyo (JP); Mitsui Mining & Smelting Co., Ltd., Tokyo (JP)

(*) Notice: Subject to any disclaimer, the term of this patent is extended or adjusted under 35 U.S.C. 154(b) by 365 days.

(21) Appl. No.: 14/389,129

(22) PCT Filed: Sep. 12, 2012

(86) PCT No.: PCT/JP2012/073275
§ 371 (c)(1),
(2), (4) Date: Sep. 29, 2014

(87) PCT Pub. No.: WO2013/145375
PCT Pub. Date: Oct. 3, 2013

(65) Prior Publication Data
US 2015/0086434 A1  Mar. 26, 2015

(30) Foreign Application Priority Data
Mar. 30, 2012 (JP) ................ 2012-080853

(51) Int. Cl.
*B01D 53/86* (2006.01)
*B01D 53/94* (2006.01)
(Continued)

(52) U.S. Cl.
CPC ......... *B01D 53/865* (2013.01); *B01D 53/944* (2013.01); *B01J 23/63* (2013.01);
(Continued)

(58) Field of Classification Search
None
See application file for complete search history.

(56) References Cited

U.S. PATENT DOCUMENTS 4,437,304 A * 3/1984 Ikenoya .................. F01N 3/22
60/290
2001/0053340 A1* 12/2001 Noda ................... B01D 53/945
423/213.2
(Continued)

FOREIGN PATENT DOCUMENTS

JP  05-277373  10/1993
JP  06-000378  1/1994
(Continued)

*Primary Examiner* — Walter D Griffin
*Assistant Examiner* — Jelitza Perez
(74) *Attorney, Agent, or Firm* — The Webb Law Firm

(57) ABSTRACT

Provided is a novel palladium catalyst capable of efficiently purifying carbon monoxide (CO) and total hydrocarbons (THC) under a fuel-rich atmosphere even when palladium (Pd) is used as a catalyst active component. Proposed is a palladium monolayer catalyst for an exhaust gas from a saddle-riding-type vehicle, which is an exhaust gas purification catalyst for a saddle-riding-type vehicle to be installed in an exhaust gas passage in an internal combustion engine. The palladium monolayer catalyst includes a substrate, and a catalyst layer that has the form of a monolayer and contains palladium acting as a catalyst active component, an inorganic porous body acting as a catalyst carrier, ceria ($CeO_2$) particles acting as a promoter component, and barium.

6 Claims, 1 Drawing Sheet

(51) Int. Cl.
*F01N 3/10* (2006.01)
*B01J 23/63* (2006.01)

(52) U.S. Cl.
CPC ...... *F01N 3/101* (2013.01); *B01D 2255/1023* (2013.01); *B01D 2255/2042* (2013.01); *B01D 2255/2065* (2013.01); *B01D 2258/01* (2013.01); *F01N 2590/04* (2013.01); *Y02T 10/22* (2013.01)

(56) References Cited

U.S. PATENT DOCUMENTS

| | | | | |
|---|---|---|---|---|
| 2010/0111789 A1* | 5/2010 | Fajardie | ............... | B01D 53/945 423/213.2 |
| 2012/0122667 A1* | 5/2012 | Matsueda | ............ | B01D 53/945 502/240 |

FOREIGN PATENT DOCUMENTS

| | | |
|---|---|---|
| JP | 06-099069 | 4/1994 |
| JP | 06-219721 | 8/1994 |
| JP | 09-262471 | 10/1997 |
| JP | 10-077829 | 3/1998 |
| JP | 10-277394 | 10/1998 |
| JP | 2001-145836 | 5/2001 |
| JP | 2005-224792 | 8/2005 |
| JP | 2006-263582 | 10/2006 |
| JP | 2010-058069 | 3/2010 |
| JP | 2010-521302 A | 6/2010 |
| JP | 2010-227739 | 10/2010 |
| JP | 2010-227931 | 10/2010 |
| JP | 2011-020013 | 2/2011 |
| JP | 2011-140011 | 7/2011 |
| WO | 20081113457 A1 | 9/2008 |
| WO | 20101109734 A1 | 9/2010 |

\* cited by examiner

US 9,737,850 B2

EXHAUST GAS PURIFICATION PALLADIUM MONOLAYER CATALYST FOR SADDLE-RIDING-TYPE VEHICLE

CROSS-REFERENCE TO RELATED APPLICATIONS

This application is the United States national phase of International Application No. PCT/JP2012/073275 filed Sep. 12, 2012, and claims priority to Japanese Patent Application No. 2012-080853 filed Mar. 30, 2012, the disclosures of which are hereby incorporated in their entirety by reference.

TECHNICAL FIELD

The present invention relates to an exhaust gas purification catalyst for a saddle-riding-type vehicle, which is capable of being mounted on a saddle-riding-type vehicle such as a two-wheeled vehicle and being used to purify an exhaust gas emitted from an internal combustion engine of the vehicle, and particularly a palladium monolayer catalyst in which a main component of catalyst active species is palladium (Pd) among them.

BACKGROUND ART (Three-Way Catalyst)

Exhaust gases of vehicles using gasoline as a fuel include harmful components such as total hydrocarbons (THC), carbon monoxide (CO), and nitrogen oxides (NOx). As such, it is necessary to purify each harmful component using a catalyst by oxidizing THC into water and carbon dioxide, by oxidizing CO into carbon dioxide, and by reducing NOx to nitrogen.

As catalysts for treating such exhaust gases (hereinafter referred to as "exhaust gas purification catalysts"), three-way catalysts (TWCs) enabling reduction-oxidation of CO, THC, and NOx are used.

As such a three-way catalyst, a catalyst adapted to load a noble metal on a refractory oxide porous body having a wide specific surface area, for instance, an alumina porous body having a wide specific surface area, and to load this material on either a substrate, for instance, a monolithic substrate made of a refractory ceramic or metal honeycomb structure, or refractory particles is known.

(OSC Material)

In this type of three-way catalyst, the noble metal preferably functions to oxidize hydrocarbon in the exhaust gas into carbon dioxide and water, to oxidize carbon monoxide into carbon dioxide, and to reduce nitrogen oxides to nitrogen, and maintains a ratio of air to fuel (air fuel ratio) in a constant way (to a theoretical air fuel ratio) in order to effectively produce catalysis for both of the reactions at the same time.

In internal combustion engines of, for instance, vehicles, the air fuel ratio is greatly changed depending on driving circumstances such as acceleration, deceleration, low-speed driving, and high-speed driving. As such, the air fuel ratio (A/F) that varies according to operational conditions of the engine is constantly controlled using an oxygen sensor (zirconia). However, since it is difficult for the catalyst to sufficiently exert purification catalyst performance in the case of merely controlling the air fuel ratio (A/F) in this way, a function of controlling the air fuel ratio (A/F) is also required of a catalyst layer itself. Thus, for the purpose of preventing a decrease in purification performance of the catalyst, which is caused due to a change in the air fuel ratio, using a chemical action of the catalyst itself, a catalyst in which a promotor is added a noble metal that is a catalyst active component is used.

As such a promotor, a promoter (called an "OSC material") having an oxygen storage capacity (OSC) to release oxygen in a reduction atmosphere and to absorb oxygen in an oxidation atmosphere is known. For example, ceria (cerium oxide, $CeO_2$) or ceria-zirconia composite oxide is known as the OSC material having the oxygen storage capacity.

Ceria ($CeO_2$) has a characteristic that extends a range (window) of the air fuel ratio capable of efficiently purifying CO, THC, and NOx, and in which desorption and absorption of attached oxygen and lattice oxygen in the cerium oxide can be performed depending on a level of an oxygen partial pressure in the exhaust gas. In other words, when the exhaust gas has a reducing property, the cerium oxide desorbs the oxygen ($CeO_2 \rightarrow CeO_{2-x} + (x/2)O_2$) to feed the oxygen into the exhaust gas, thereby causing an oxidation reaction. On the other hand, when the exhaust gas has an oxidizing property, the cerium oxide reversely takes the oxygen in oxygen deficiency ($CeO_{2-x} + (x/2)O_2 \rightarrow CeO_2$), reducing an oxygen concentration in the exhaust gas to cause a reduction reaction. In this way, the cerium oxide fulfills a function as a buffer that decreases a change in the oxidizing and reducing properties of the exhaust gas, and has a function of maintaining the purification performance of the catalyst.

Further, the ceria-zirconia composite oxide that causes zirconia to be dissolved in this ceria is added to many catalysts as the OSC material, because the oxygen storage capacity (OSC) thereof is better.

With regard to the three-way catalyst using the OSC material such as ceria or ceria-zirconia composite oxide, the following inventions have hitherto been disclosed.

For example, in JP H06-219721 A, as a metal-metal oxide catalyst having a new catalyst characteristic, a catalyst that uniformly contains metal particles in metal oxide particles and contains any of Pt, Pd, Rh, and Au as a noble metal and $CeO_2$ as a metal oxide is disclosed.

In JP 2011-140011 A, as a CO oxidation catalyst capable of showing a CO oxidation activity at a wide range of temperatures including a low temperature, a CO oxidation catalyst that carries Pd on $CeO_2$ carrier particles and is formed by heat treatment in an oxidizing atmosphere at a temperature ranging from 850 to 950° C. is disclosed.

In JP H10-277394 A, as a catalyst that contains only palladium having a high conversion rate of hydrocarbon, carbon monoxide, and nitrogen oxide and excellent heat and aging resistance, a vehicle exhaust gas catalyst having a) fine active aluminium oxide stabilized, b) at least one fine oxygen storage component, c) and additionally high-dispersivity cerium oxide, zirconium oxide, and barium oxide, and d) a coat layer having catalysis of one layer made of palladium as a single catalysis noble metal on an inactive substrate is disclosed.

In JP 2005-224792 A), as a three-way catalyst in which Pd is carried on a support material based on a composite oxide containing Al, Ce, Zr, Y, and La, a catalyst in which a ratio BA of the total number B of moles of Al, Ce, Zr, Y, and La atoms to the number A of moles of Al atoms in the support material is 1/48 or more and 1/10 or less, a part of Pd is in a metal state, and a balance is in an oxide state is disclosed.

In JP 2010-521302 W, a three-way catalyst configured to apply strontium oxide or barium oxide to a surface of a catalyst layer made of aluminium oxide, cerium/zirconium mixed oxide catalytically activated by rhodium, and cerium/zirconium mixed oxide catalytically activated by palladium is disclosed.

(Exhaust Gas Purification Catalyst for Two-Wheeled Vehicle)

Incidentally, an exhaust gas purification catalyst for a two-wheeled vehicle has special problems different from those of an exhaust gas purification catalyst for a four-wheeled vehicle. For example, in comparison with the exhaust gas purification catalyst for the four-wheeled vehicle, the exhaust gas purification catalyst for the two-wheeled vehicle is required to have a small capacity and yet to exert a high purification capacity because of a limited space in which the catalyst is mounted.

Further, the two-wheeled vehicle makes heavy use of fuel because there is a tendency to emphasize output. Accordingly, an oxygen concentration in the exhaust gas is reduced, and thus the air fuel ratio (A/F) is frequently less than the theoretical air fuel ratio of 14.5. For this reason, even in the fuel-rich exhaust gas in which the air fuel ratio (A/F) is less than 14.5, it is required to efficiently purify the exhaust gas.

In this way, the exhaust gas purification catalyst for the two-wheeled vehicle has the special problems different from those of the exhaust gas purification catalyst for the four-wheeled vehicle. As such, the following proposals are made with respect to the conventional exhaust gas purification catalyst for the two-wheeled vehicle.

For example, in JP 2001-145836 A, as an exhaust gas purification catalyst that suppresses detachment of a catalyst layer caused by heat or vibrations to the minimum extent, suppresses thermal degradation of a catalytic material as well, and exerts good purification performance under severe conditions, there is proposed an exhaust gas purification catalyst that contains a metal carrier made of a cylindrical heat-resistant stainless punching metal, an undercoating layer of heat-resistant inorganic oxide to which an oxygen occlusion material placed on a surface of the carrier is added, and a catalyst layer placed on the undercoating layer, and that uses cerium oxide or a composite oxide of cerium and zirconium as the oxygen occlusion material.

In JP 2010-227739, as an exhaust gas purification catalytic material in which a catalytic activity is rarely reduced even in a two-wheeled vehicle exhaust gas atmosphere characterized by a drastic change in concentrations of oxygen, and HC and CO of unburned gas components in an exhaust gas and an excessive wind width of A/F, there is proposed an exhaust gas purification catalytic material having a carrier made of a cerium-zirconium based composite oxide containing 45 to 70 mass % of $CeO_2$, 20 to 45 mass % of $ZrO_2$, 2 to 20 mass % of $Nd_2O_3$, and 1 to 10 mass % of $La_2O_3$, and a catalyst component made of metal Pd or Pd oxide carried on the carrier.

In JP 2010-58069 A, there is proposed an exhaust gas purification catalyst for a two-wheeled vehicle, which is made up of a honeycomb-shaped carrier substrate having a plurality of cell passages, and a catalyst coating layer formed inside the cell passages of the carrier substrate, and in which the carrier substrate is divided into a front stage and a rear stage, and as a catalyst noble metal, palladium and rhodium are carried on the catalyst coating layer of the front stage, and rhodium is carried on the catalyst coating layer of the rear stage.

In JP 2011-20013 A, there is proposed an exhaust gas purification catalyst which is capable of efficiently purifying carbon monoxide and hydrocarbons even in a fuel-rich exhaust gas which a vehicle such as a two-wheeled vehicle emits and in which an air fuel ratio (A/F) is less than 14.5, and which contains cerium oxide, zirconium oxide, aluminium oxide, yttrium oxide, and/or magnesium oxide, and a noble metal, and the total concentration of yttrium and/or magnesium is 2.0 wt % to 5.0 wt % with respect to the total amount of the catalyst.

While vehicle driving, an oxygen excess condition (lean burn condition) on which an oxidation reaction is favorable and a fuel excess condition (rich burn condition) on which a reduction reaction is favorable alternate with each other with repetition in response to driving conditions. For this reason, it is necessary for the catalyst for the exhaust gas to exert predetermined catalyst performance or more under any of the oxygen excess condition (lean burn condition) and the fuel excess condition (rich burn condition). Especially, in the case of the two-wheeled vehicle, there is a tendency to raise the number of revolutions of an engine to drive the vehicle under a fuel-rich atmosphere. As such, it is required to exert the catalyst performance under the fuel-rich atmosphere.

On the other hand, in the existing three-way catalyst, platinum (Pt) and rhodium (Rh) among noble metals have been frequently used as the catalyst active components. However, since the prices of these noble metals are extremely high, development of a palladium catalyst using less expensive palladium (Pd) in quantity is required.

However, when palladium (Pd) was used as the catalyst active component, the purification performance as the exhaust gas purification three-way catalyst was shown to be good on a region from a theoretical air fuel ratio (stoichiometry) (A/F=14.7) to a lean air fuel ratio (A/F=14.7 or more) but, particularly, the purification performance of carbon monoxide (CO) was apt to be remarkably reduced under a fuel-rich atmosphere (A/F=less than 14.5), compared to the case of using rhodium and platinum as the catalyst active component.

Therefore, an object of the invention is to provide a new palladium catalyst capable of efficiently purifying carbon monoxide (CO) and hydrocarbons (THC) under a fuel-rich atmosphere even when palladium (Pd) is used as a catalyst active component.

SUMMARY OF THE INVENTION

The invention is to propose a palladium monolayer catalyst for an exhaust gas from a saddle-riding-type vehicle, which is an exhaust gas purification catalyst for the saddle-riding-type vehicle to be installed in an exhaust gas passage in an internal combustion engine, the palladium monolayer catalyst including: a substrate; and a catalyst layer having the form of a monolayer and containing palladium acting as a catalyst active component, an inorganic porous body acting as a catalyst carrier, ceria ($CeO_2$) particles acting as a promoter component, and barium.

As described above, in a fuel-rich region in which an air fuel ratio is less than 14.5, a rate of air is low, and there is under a reduction atmosphere. As such, carbon monoxide and hydrocarbon are rarely oxidized, and purification rates thereof have a tendency to be reduced. Particularly, when palladium (Pd) has been used as a catalyst active component, purification performance of carbon monoxide (CO) has been apt to be remarkably deteriorated. However, in the palladium monolayer catalyst which the invention proposes, palladium (Pd) acting as the catalyst active component and ceria ($CeO_2$) particles acting as a promoter component are combined and used. Thereby, CO and THC are adapted to be able to be efficiently purified under a fuel-rich atmosphere.

In the invention, the term "under a fuel-rich atmosphere" refers to an air fuel ratio (A/F)<14.6.

The term "palladium monolayer catalyst" refers to a catalyst of a monolayer in which a noble metal, which is a main component of the catalyst active component contained in the catalyst layer, is only palladium (Pd), is also abbreviated and represented herein as a "Pd monolayer catalyst."

The term "saddle-riding-type vehicle" refers to including a saddle-riding-type two-wheeled vehicle, a saddle-riding-type three-wheeled vehicle, a saddle-riding-type four-wheeled vehicle as well as a scooter type motorcycle.

BEST MODE(S) FOR CARRYING OUT THE INVENTION

Hereinafter, embodiments of the invention will be described, but the invention is not limited to the embodiments to be described below.

<Saddle-Riding-Type Vehicle>

A palladium monolayer catalyst of the invention is installed on an exhaust gas passage of an internal combustion engine of a saddle-riding-type vehicle, and produces effects thereof. In other words, one or more palladium monolayer catalysts of the invention may be disposed in, for instance, an exhaust pipe or a muffler.

Further, the catalyst reacts with a high-temperature combustion gas and accelerates a chemical reaction (oxidation and reduction actions), and thus the exhaust gas purification catalyst is preferably disposed directly below an exhaust port having a high exhaust gas temperature.

An example of the saddle-riding-type vehicle suitable to mount the palladium monolayer catalyst of the invention may include a saddle-riding-type vehicle on which an exhaust gas purification device, in which an air fuel ratio of the exhaust gas flowing in the exhaust gas passage is set to be 15 or more by a combination of a carburetor and a secondary air supply system, is mounted.

When the secondary air supply system using a reed valve operated depending on an exhaust gas pressure is used for a secondary supply mechanism, and usually, if a negative region in exhaust gas pulsation pressure is in a slow engine speed state or in a loaded state, a supply amount of secondary air is reduced to facilitate becoming a reduction atmosphere. When the state of this reduction atmosphere goes on, catalyst performance is not stabilized. However, when the air fuel ratio of the exhaust gas flowing in the exhaust gas passage is set to be 15 or more by the combination of the carburetor and the secondary air supply system, the catalyst can be stabilized to exert the catalyst performance.

The exhaust gas purification device suitable to set the air fuel ratio of the exhaust gas flowing in the exhaust gas passage to be 15 or more by the combination of the carburetor and the secondary air supply system may include an exhaust gas purification device that has a dirty side and a clean side and is equipped with an air cleaner purifying air suctioned to the dirty side and supplying the air to an engine via the clean side and a secondary air supply system supplying secondary air from the clean side of the air cleaner with respect to an exhaust port of the engine. The palladium monolayer catalyst of the invention is effectively provided for the exhaust gas passage of the internal combustion engine thereof.

Figure 1:
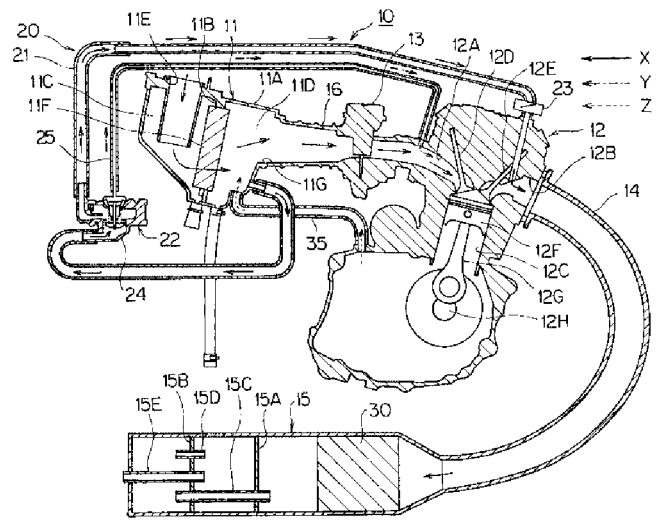
FIG. 1 is a schematic diagram illustrating one example of an exhaust gas purification device for a saddle-riding-type vehicle suitable for mounting a palladium monolayer catalyst of the invention, and one example of a peripheral constitution thereof.

As the exhaust gas purification device as described above, for example, an exhaust gas purification device shown in FIG. 1 may be illustrated.

The exhaust gas purification device 10 shown in FIG. 1 is mounted on a saddle-riding-type vehicle itself in which fuel is mixed with air supplied from an air cleaner 11 to an engine (internal combustion engine) 12 by a carburetor 13, and includes a secondary air supply system 20 supplying secondary air (purified air) from the air cleaner 11 to an exhaust port 12B of the engine 12, and an exhaust muffler 15 connected to the engine 12 via an exhaust pipe 14. The catalyst of the invention has only to be installed in the exhaust muffler 15.

Further, in FIG. 1, an arrow X indicates a flow of air, an arrow Y indicates a vacuum pressure, and an arrow Z indicates a flow of a blow-by gas generated inside a crank case.

As shown in FIG. 1, the air cleaner 11 has an air cleaner case 11A, an inside of which is partitioned into two chambers on a dirty side (open air introduction chamber) 11C and a clean side (clean air chamber) 11D by a partition wall 11B. The dirty side 11C is provided with an open air introduction port 11E, and open air is introduced into the dirty side 11C via the open air introduction port 11E. A filter element 11F is disposed on the partition wall 11B so as to cover an opening that causes the dirty side 11C and the clean side 11D to communicate with each other. The air inside the dirty side 11C passes through the filter element 11F, and is then introduced to the clean side 11D after the air is purified. The clean side 11D is provided with an air discharge port 11G, and the air discharge port 11G is connected to the carburetor 13 via a connecting tube 16, and communicates with an intake port 12A of the engine 12 via the carburetor 13.

The engine 12 is a typical 4-cycle engine mounted on, for instance, a motorcycle, and includes an intake valve 12D opening/closing the intake port 12A communicating with a cylinder hole (cylinder) 12C inside the engine 12, and an exhaust valve 12E opening/closing the exhaust port 12B communicating with the cylinder hole 12C. A piston 12F that is slidably disposed in the cylinder hole 12C is connected to a crank shaft 12H via a connecting rod 12G. In the case of an intake stroke during which the piston 12F moves downward in a state in which the intake valve 12D of the engine 12 is open (whereas the exhaust valve 12E is closed), the air inside the clean side 11D of the air cleaner 11 is suctioned to an upper side of the piston 12F of the cylinder hole 12C via the carburetor 13 by a negative pressure on the side of the engine 12 generated by the downward movement of the piston 12F, and the fuel is supplied from the carburetor 13. A mixture of the fuel and the air is supplied to the engine 12.

Subsequently, after general compression stroke and combustion process of the 4-cycle engine, an exhaust stroke during which the piston 12F moves upward in a state in which the exhaust valve 12E is open (whereas the intake valve 12D is closed) is carried out. Thereby, a combustion gas is discharged to the exhaust port 12B, and is discharged to the exhaust pipe 14 as the exhaust gas.

The exhaust muffler 15 is connected to a rear end of the exhaust pipe 14. This exhaust muffler 15 functions as a silencer that silences the high-temperature high-pressure exhaust gas passing through the exhaust pipe 14 and discharges the silenced exhaust gas to the outside.

In FIG. 1, the exhaust muffler 15 is configured in a multistage expansion form in which it is partitioned into a plurality of chambers by a plurality of partitions 15A and 15B, and each chamber is spatially connected by communication pipes 15C, 15D, and 15E. The catalyst may be disposed in a front chamber located on an uppermost stream side.

The secondary air supply system 20 is a mechanism that send the air (secondary air) of the clean side 11D of the air cleaner 11 to the exhaust port 12B of the engine 12, and is equipped with a secondary air supply pipe 21 connecting the clean side 11D of the air cleaner and the exhaust port 12B of the engine 12. A valve unit 22 is provided in the middle of the secondary air supply pipe 21, and a reed valve 23 for preventing the exhaust gas from flowing from the exhaust port 12B back to the secondary air supply pipe 21 is installed between the valve unit 22 and the exhaust port 12B. Further, FIG. 1 shows a state in which, from the viewpoint of improving followability of the reed valve 23, the reed valve 23 is arranged above the engine 12 at a position nearer than the exhaust port 12B.

The valve unit 22 is equipped with a secondary air supply control valve 24 for preventing the secondary air from being supplied to the exhaust port 12B during deceleration of the engine. The secondary air supply control valve 24 is configured to operate depending on the vacuum pressure of the intake port 12A which is transmitted via a communication pipe 25 connecting the intake port 12A of the engine 12 and the valve unit 22.

Further, the reference number 35 in the figure indicates a communication pipe that spatially connects the clean side 11D of the air cleaner 11 and the crank case of the engine 12. The communication pipe 35 functions as a crank case emission controller that returns a blow-by gas generated inside the crank case to the engine 12 through the air cleaner 11 and the carburetor 13 and prevents the blow-by gas from being released.

In general, in the case of using the carburetor 13, an oxygen concentration in the exhaust gas is also liable to become lean, because the air fuel ratio is set to the rich side to smoothly follow a request for acceleration from a driver. Thus, as the oxygen concentration in the exhaust gas is increased by providing the secondary air supply system 20, the secondary air supply system 20 and the carburetor 13 are preferably set to stabilize a purifying function to at least satisfy, for instance, a durable distance (driving distance that maintains a state not more than an exhaust gas regulation value) of exhaust gas regulations provided depending on the country.

As the carburetor 13 and the secondary air supply system 20 are adjusted and improved to change the air fuel ratio of a catalyst inlet, the air fuel ratio of the catalyst inlet can be set to be 15 or more in all regions of 55 km/h or less. Thereby, even when a relative low-cost carburetor is used for a small vehicle, durability deterioration of the catalyst can be suppressed within a request level of the exhaust gas regulations while avoiding poor drivability caused by reducing the air fuel ratio, and the performance of the catalyst can be stabilized over a long period.

<Exhaust Gas Purification Catalyst>

Next, as the catalyst that is particularly suitable to be mounted on a two-wheeled vehicle having the aforementioned structure and control, the catalyst according to one example of the embodiment of the invention will be described.

As one example of the embodiment of the invention, a palladium catalyst (referred to as the "present Pd monolayer catalyst") having a substrate and a catalyst layer containing palladium, an inorganic porous body, ceria particles, and a stabilizer acting as a monolayer will be described.

A Pd monolayer catalyst having, as a configuration of the present Pd monolayer catalyst, a configuration in which the catalyst layer is formed by, for instance, wash-coating a catalyst composition, which contains palladium, an inorganic porous body, ceria particles, and a stabilizer, on a surface of a substrate presenting, for instance, a honeycomb-shaped (monolithic) structure may be given.

Hereinafter, each the above constituent materials constituting the present Pd monolayer catalyst will be described.

(Substrate)

A material of the substrate used for the present Pd monolayer catalyst may include a refractory material such as ceramic or a metal material.

The ceramic material for the substrate may include refractory ceramic materials such as cordierite, cordierite-alpha alumina, silicon nitride, zircon mullite, spodumene, alumina-silica magnesia, zirconium silicate, sillimanite, magnesium silicate, zircon, petalite, alpha alumina, and aluminosilicate.

The metal material for the substrate may include refractory metals such as stainless steel or other proper corrosion-resistant alloys based on iron.

A shape of the substrate may include a honeycomb shape, a pellet shape, and a spherical shape.

As a honeycomb material, for instance, a cordierite material such as ceramic is generally used in many cases. Further, a metal honeycomb made of a metal material such as ferritic stainless steel may also be used.

A metal honeycomb structure may be formed by rolling a metal foil made of stainless steel or heat-resistant steel. For example, two honeycomb bodies are disposed in parallel at ingress and egress gas sides inside a metal outer cylinder at a regular interval, which may be given as an example. The honeycomb structure may be directly inserted into an exhaust pipe or a muffler in place of the outer cylinder.

In addition, a cylindrical punching metal may also be used. When a punching metal called a punching pipe or a punching tube is used, heat resistance is improved, and through-holes are formed by punching. As such, a wide surface area is obtained, and exhaust gas purification performance is improved. Furthermore, since exhaust resistance is reduced inside the exhaust pipe, the punching metal is suitable for use as a two-wheeled vehicle.

In the case of using the honeycomb-shaped substrate, for example, a monolithic substrate having numerous fine gas flow passages, that is numerous channels, inside the substrate in parallel such that a fluid circulates inside the substrate may be used. In this case, the catalyst layer may be formed on an inner wall surface of each channel of the monolithic substrate by coating such as wash-coating.

Further, in the case of a two-wheeled vehicle, particularly a small two-wheeled vehicle, the catalyst needs to be made small, and thus, may employ a structure that divides the catalyst into two pieces, for instance, by providing a separator at an inlet side of the catalyst, and causes a turn flow at the other end by a hemispherical cap.

(Monolayer Catalyst Layer)

The present Pd monolayer catalyst is characterized by one catalyst layer that contains palladium, an inorganic porous body, ceria particles, and a stabilizer, and furthermore other components as needed.

Such a catalyst layer is typically coated and formed on surfaces of cell passages of the honeycomb structure, for instance, when the honeycomb-shaped substrate is used.

The catalyst layer is preferably contained at a rate of 40 g to 300 g per 1 liter substrate.

If the content of the catalyst layer is equal to or more than 40 g per 1 liter substrate, it is not necessary to significantly reduce a solid concentration when the catalyst composition is converted into a slurry, and it is possible to secure adhesiveness with a honeycomb substrate (for example, 100 cells) having large through-holes. In contrast, if the content of the catalyst layer is not more than 300 g, even a honeycomb substrate (for example, 1200 cells) having small through-holes allows the through-holes thereof to be inhibited from being clogged.

From such a viewpoint, the content of the catalyst layer is still more preferably equal to or more than 60 g or not more than 250 g per 1 liter substrate, and among them, furthermore preferably equal to or more than 80 g or not more than 200 g.

(Inorganic Porous Material)

Since a bonding force between the substrate and the catalyst active component is not typically so strong, it is difficult to secure a sufficient carried amount even when the catalyst active component is caused to be directly carried on the substrate. Thus, to cause a sufficient amount of catalyst active component to be carried on the surface of the substrate in a highly dispersed state, preferably the catalyst active component is caused to be carried on a particulate inorganic porous body having a high specific surface area, and the inorganic porous body on which the catalyst active component is carried is coated on the surface of the substrate, thereby forming the catalyst layer.

The inorganic porous body may include a porous material of a compound selected from the group consisting of, for instance, silica, alumina, and titania compounds, and more particularly a porous material made of a compound selected from the group consisting of, for instance, alumina, silica, silica-alumina, alumino-silicates, alumina-zirconia, alumina-chromia, and alumina-ceria.

As alumina among them, alumina whose specific surface area is larger than 50 m$^2$/g, for instance γ-, δ-, θ-, or α-alumina, may be used. Above all, γ- or θ-alumina is preferably used. Alternatively, to enhance heat resistance, a trace of La may also be contained for alumina.

(Ceria Particles)

The present Pd monolayer catalyst contains ceria (cerium dioxide, $CeO_2$) particles as promoters having oxygen storage capacity (OSC) but does not contain zirconia as the promoter, which is one of the characteristics of the present Pd monolayer catalyst.

The palladium (Pd) and ceria ($CeO_2$) particles are combined and used. Preferably, palladium is carried on the ceria particles, and thereby carbon monoxide (CO) and hydrocarbons (THC) are adapted to be able to be efficiently purified under a fuel-rich atmosphere as well. This can be considered that, because a Pd—O—Ce bond is formed to lead to a high oxidation state by loading palladium on the ceria particles, carbon monoxide (CO) and hydrocarbons (THC) can be efficiently purified under the fuel-rich atmosphere as well.

The ceria particles are preferably contained at a rate of 15 to 50 mass parts based on 100 mass parts of the catalyst layer.

If the content of the ceria particles in the catalyst layer is equal to or more than 15 mass parts, CO and THC can be sufficiently purified under the fuel-rich atmosphere. In contrast, if the content of the ceria particles in the catalyst layer is not more than 50 mass parts, the adhesiveness with the substrate can be more reliably secured.

From such a viewpoint, the content of the ceria particles is further preferably contained at a rate of equal to or more than 20 mass parts or not more than 40 mass parts based on 100 mass parts of the catalyst layer, and among them, particularly preferably equal to or more than 20 mass parts or not more than 35 mass parts.

(Catalyst Active Component)

The present Pd monolayer catalyst is characterized in that a noble metal having a catalytic activity is only palladium (Pd) to cut the overall price of the catalyst.

A content of palladium in the present Pd monolayer catalyst is preferably a rate of 0.01 to 10 g per 1 liter substrate. As palladium is contained within such a range, CO and THC are adapted to be able to be sufficiently purified under the fuel-rich atmosphere. However, if an amount of palladium is increased, this brings about a rise in prices of manufactured goods. As such, it is difficult to use palladium in quantity.

From such a viewpoint, the content of the present Pd monolayer catalyst is still more preferably equal to or more than 0.15 g or not more than 7 g per 1 liter substrate, and among them, furthermore preferably equal to or more than 0.3 g or not more than 5 g.

Further, palladium mentioned above is preferably contained at a rate of 0.003 to 25 mass parts based on 100 mass parts of the catalyst layer. As palladium is contained within such a range, CO and THC are adapted to be able to be sufficiently purified under the fuel-rich atmosphere. However, if an amount of palladium is increased, this brings about a rise in prices of manufactured goods. As such, it is difficult to use palladium in quantity.

From such a viewpoint, palladium mentioned above is still more preferably contained at equal to or more than 0.05 mass parts or not more than 3 mass parts based on 100 mass parts of the catalyst layer, and among them, furthermore preferably equal to or more than 0.1 mass parts or not more than 2 mass parts.

(Stabilizer)

For the purpose of inhibiting PdOx from being reduced to metal under the fuel-rich atmosphere, the present Pd monolayer catalyst preferably contains a stabilizer.

The stabilizer may include, for instance, an alkaline earth metal or an alkali metal.

Especially, the stabilizer may be selected from one or two of metals selected from the group consisting of magnesium, barium, calcium, and strontium, and preferably strontium and barium. Among them, barium is most preferable in terms of the fact that a temperature at which PdOx is reduced is highest, that is, that PdOx is resistant to reduction.

(Other Components)

The present Pd monolayer catalyst may contain known added components such as a binder component.

As the binder component, an inorganic binder, for instance, an aqueous solution such as an alumina sol, a silica sol, or a zirconia sol may be used. When calcined, these may take a form of an inorganic oxide.

In addition, the present Pd monolayer catalyst may contain zirconia as the binder component. In this case, zirconia acting as the promoter component and zirconia acting as the binder component may be distinguished by a technique for, for instance, observing them using an electron microscope. In other words, this is because zirconia acting as the promoter component is dispersed at the same portion as the ceria particle or around the ceria particle, while zirconia acting as the binder is not dispersed only at the same portion as the ceria particle or around the ceria particle.

<Manufacturing Method>

An example for manufacturing the present Pd monolayer catalyst include a method of mixing and agitating an inorganic porous body, ceria ($CeO_2$) particle powder or an aqueous Ce salt, a binder, and water into a slurry using, for instance, a ball mill, then immersing substrate such as a ceramic honeycomb structure into the slurry, pulling up and calcining the immersed substrate, and forming a catalyst layer on a surface of the substrate.

However, the method for manufacturing the present Pd monolayer catalyst may employ any known method, and is not limited to the aforementioned example. For example, as the method of forming the catalyst layer on the surface of the substrate, a wash-coating method may be employed in addition to the impregnation method as described above.

<Description of Terminology>

In the case of being expressed as the phrase "X to Y" (X and Y are arbitrary numbers) in the specification, unless otherwise stated, the phrase includes the meaning of "preferably more than X" or "preferably less than Y" along with the meaning "equal to or more than X and not more than Y."

Further, in the case of being expressed as the phrase "equal to or more than X" (X is an arbitrary number) or the phrase "not more than Y" (Y is an arbitrary number), the phrase also includes the intention of being "preferably more than X" or "preferably less than Y."

EXAMPLES

Hereinafter, the invention will be described in greater detail based on the following examples and comparative examples.

Example 1

83.3 mass parts of porous γ-alumina, 6.7 mass parts of ceria particle powder, 10 mass parts of an alumina sol as an inorganic binder when calculated in terms of an oxide, and 150 mass parts of pure water were weighted and mixed with a ball mill, thereby obtaining a slurry.

φ40 mm×L60 mm (100 cells): A metal honeycomb substrate that had a carrier volume of 0.0754 L and was made of stainless steel was immersed into the slurry and was pulled up. A surplus slurry was blown off by an air gun, and then the honeycomb substrate was calcined under an air atmosphere at 600° C. for 3 hours, thereby forming a coating layer. At this time, an amount of the coating layer was 150 g per 1 L honeycomb substrate.

The honeycomb substrate with the coating layer obtained in this way was immersed into a palladium nitrate solution. Extra droplets were blown off by an air gun, and the honeycomb substrate was calcined under an air atmosphere at 600° C. for 3 hours. After Pd was carried, the honeycomb substrate was subsequently immersed into an aqueous barium acetate solution. Extra droplets were blown off by an air gun, and the honeycomb substrate was calcined under an air atmosphere at 600° C. for 3 hours. Ba was carried to form a catalyst layer, thereby obtaining a Pd monolayer catalyst. At this time, an amount of the catalyst layer was 150 g with respect to 1 L of the honeycomb substrate, and an amount of Pd was 1 g with respect to 1 L of the honeycomb substrate. Further, an amount of Ba was 1.3 g with respect to 1 L of the honeycomb substrate when calculated in terms of an oxide.

Example 2

76.6 mass parts of porous γ-alumina, 13.4 mass parts of ceria powder, 10 mass parts of an alumina sol as an inorganic binder when calculated in terms of an oxide, and 150 mass parts of pure water were weighted and mixed with a ball mill, thereby obtaining a slurry.

φ40 mm×L60 mm (100 cells): A metal honeycomb substrate that had a carrier volume of 0.0754 L and was made of stainless steel was immersed into the slurry and was pulled up. A surplus slurry was blown off by an air gun, and then the honeycomb substrate was calcined under an air atmosphere at 600° C. for 3 hours, thereby forming a coating layer. At this time, an amount of the coating layer was 150 g per 1 L honeycomb substrate.

The honeycomb substrate with the coating layer obtained in this way was immersed into a palladium nitrate solution. Extra droplets were blown off by an air gun, and the honeycomb substrate was calcined under an air atmosphere at 600° C. for 3 hours. After Pd was carried, the honeycomb substrate was subsequently immersed into an aqueous barium acetate solution. Extra droplets were blown off by an air gun, and the honeycomb substrate was calcined under an air atmosphere at 600° C. for 3 hours. Ba was carried to form a catalyst layer, thereby obtaining a Pd monolayer catalyst. At this time, an amount of the catalyst layer was 150 g with respect to 1 L of the honeycomb substrate, and an amount of Pd was 1 g with respect to 1 L of the honeycomb substrate. Further, an amount of Ba was 1.3 g with respect to 1 L of the honeycomb substrate when calculated in terms of an oxide.

Example 3

70 mass parts of porous γ-alumina, 20 mass parts of ceria powder, 10 mass parts of an alumina sol as an inorganic binder when calculated in terms of an oxide, and 150 mass parts of pure water were weighted and mixed with a ball mill, thereby obtaining a slurry.

φ40 mm×L60 mm (100 cells): A metal honeycomb substrate that had a carrier volume of 0.0754 L and was made of stainless steel was immersed into the slurry and was pulled up. A surplus slurry was blown off by an air gun, and then the honeycomb substrate was calcined under an air atmosphere at 600° C. for 3 hours, thereby forming a coating layer. At this time, an amount of the coating layer was 150 g per 1 L honeycomb substrate.

The honeycomb substrate with the coating layer obtained in this way was immersed into a palladium nitrate solution. Extra droplets were blown off by an air gun, and the honeycomb substrate was calcined under an air atmosphere at 600° C. for 3 hours. After Pd was carried, the honeycomb substrate was subsequently immersed into an aqueous barium acetate solution. Extra droplets were blown off by an air gun, and the honeycomb substrate was calcined under an air atmosphere at 600° C. for 3 hours. Ba was carried to form a catalyst layer, thereby obtaining a Pd monolayer catalyst. At this time, an amount of the catalyst layer was 150 g with respect to 1 L of the honeycomb substrate, and an amount of Pd was 1 g with respect to 1 L of the honeycomb substrate. Further, an amount of Ba was 1.3 g with respect to 1 L of the honeycomb substrate when calculated in terms of an oxide.

Example 4

63.3 mass parts of porous γ-alumina, 26.7 mass parts of ceria powder, 10 mass parts of an alumina sol as an inorganic binder when calculated in terms of an oxide, and 150 mass parts of pure water were weighted and mixed with a ball mill, thereby obtaining a slurry.

φ40 mm×L60 mm (100 cells): A metal honeycomb substrate that had a carrier volume of 0.0754 L and was made of stainless steel was immersed into the slurry and was pulled up. A surplus slurry was blown off by an air gun, and then the honeycomb substrate was calcined under an air atmosphere at 600° C. for 3 hours, thereby forming a coating layer. At this time, an amount of the coating layer was 150 g per 1 L honeycomb substrate.

The honeycomb substrate with the coating layer obtained in this way was immersed into a palladium nitrate solution. Extra droplets were blown off by an air gun, and the honeycomb substrate was calcined under an air atmosphere at 600° C. for 3 hours. After Pd was carried, the honeycomb substrate was subsequently immersed into an aqueous barium acetate solution. Extra droplets were blown off by an air gun, and the honeycomb substrate was calcined under an air atmosphere at 600° C. for 3 hours. Ba was carried to form a catalyst layer, thereby obtaining a Pd monolayer catalyst. At this time, an amount of the catalyst layer was 150 g with respect to 1 L of the honeycomb substrate, and an amount of Pd was 1 g with respect to 1 L of the honeycomb substrate. Further, an amount of Ba was 1.3 g with respect to 1 L of the honeycomb substrate when calculated in terms of an oxide.

Example 5

50 mass parts of porous γ-alumina, 40 mass parts of ceria powder, 10 mass parts of an alumina sol as an inorganic binder when calculated in terms of an oxide, and 150 mass parts of pure water were weighted and mixed with a ball mill, thereby obtaining a slurry.

φ40 mm×L60 mm (100 cells): A metal honeycomb substrate that had a carrier volume of 0.0754 L and was made of stainless steel was immersed into the slurry and was pulled up. A surplus slurry was blown off by an air gun, and then the honeycomb substrate was calcined under an air atmosphere at 600° C. for 3 hours, thereby forming a coating layer. At this time, an amount of the coating layer was 150 g per 1 L honeycomb substrate.

The honeycomb substrate with the coating layer obtained in this way was immersed into a palladium nitrate solution. Extra droplets were blown off by an air gun, and the honeycomb substrate was calcined under an air atmosphere at 600° C. for 3 hours. After Pd was carried, the honeycomb substrate was subsequently immersed into an aqueous barium acetate solution. Extra droplets were blown off by an air gun, and the honeycomb substrate was calcined under an air atmosphere at 600° C. for 3 hours. Ba was carried to form a catalyst layer, thereby obtaining a Pd monolayer catalyst. At this time, an amount of the catalyst layer was 150 g with respect to 1 L of the honeycomb substrate, and an amount of Pd was 1 g with respect to 1 L of the honeycomb substrate. Further, an amount of Ba was 1.3 g with respect to 1 L of the honeycomb substrate when calculated in terms of an oxide.

Comparative Example 1

90 mass parts of porous γ-alumina, 10 mass parts of an alumina sol as an inorganic binder when calculated in terms of an oxide, and 160 mass parts of pure water were weighted and mixed with a ball mill, thereby obtaining a slurry.

φ40 mm×L60 mm (100 cells): A metal honeycomb substrate that had a carrier volume of 0.0754 L and was made of stainless steel was immersed into the slurry and was pulled up. A surplus slurry was blown off by an air gun, and then the honeycomb substrate was calcined under an air atmosphere at 600° C. for 3 hours, thereby forming a coating layer. At this time, an amount of the coating layer was 150 g per 1 L honeycomb substrate.

The honeycomb substrate with the coating layer obtained in this way was immersed into a palladium nitrate solution. Extra droplets were blown off by an air gun, and the honeycomb substrate was calcined under an air atmosphere at 600° C. for 3 hours. After Pd was carried, the honeycomb substrate was subsequently immersed into an aqueous barium acetate solution. Extra droplets were blown off by an air gun, and the honeycomb substrate was calcined under an air atmosphere at 600° C. for 3 hours. Ba was carried to form a catalyst layer, thereby obtaining a Pd monolayer catalyst. At this time, an amount of the catalyst layer was 150 g with respect to 1 L of the honeycomb substrate, and an amount of Pd was 1 g with respect to 1 L of the honeycomb substrate. Further, an amount of Ba was 1.3 g with respect to 1 L of the honeycomb substrate when calculated in terms of an oxide.

Comparative Example 2

63.2 mass parts of porous γ-alumina, 13.4 mass parts of ceria powder, 13.4 mass parts of zirconia powder, 10 mass parts of an alumina sol as an inorganic binder when calculated in terms of an oxide, and 150 mass parts of pure water were weighted and mixed with a ball mill, thereby obtaining a slurry.

φ40 mm×L60 mm (100 cells): A metal honeycomb substrate that had a carrier volume of 0.0754 L and was made of stainless steel was immersed into the slurry and was pulled up. A surplus slurry was blown off by an air gun, and then the honeycomb substrate was calcined under an air atmosphere at 600° C. for 3 hours, thereby forming a coating layer. At this time, an amount of the coating layer was 150 g per 1 L honeycomb substrate.

The honeycomb substrate with the coating layer obtained in this way was immersed into a mixed solution palladium nitrate and rhodium nitrate. Extra droplets were blown off by an air gun, and the honeycomb substrate was calcined under an air atmosphere at 600° C. for 3 hours. After Pd was carried, the honeycomb substrate was subsequently immersed into an aqueous barium acetate solution. Extra droplets were blown off by an air gun, and the honeycomb substrate was calcined under an air atmosphere at 600° C. for 3 hours. Ba was carried to form a catalyst layer, thereby obtaining a Pd/Rh catalyst. At this time, an amount of the catalyst layer was 150 g with respect to 1 L of the honeycomb substrate, and an amount of Pd was 1.5 g with respect to 1 L of the honeycomb substrate. Further, an amount of Rh was 0.15 g with respect to 1 L of the honeycomb substrate, and an amount of Ba was 1.3 g with respect to 1 L of the honeycomb substrate when calculated in terms of an oxide.

Further, in Table 1 below, the "ceria amount (g/L)" indicates an amount of ceria particles contained per 1 liter substrate, and the "ceria content (%)" indicates a percentage (%) which the amount of the ceria particles accounts for in the catalyst layer. Further, the "noble metal amount (g/L)" indicates an amount of noble metal contained per 1 liter substrate.

TABLE 1

|  | Ceria amount (g/L) | Ceria content (%) | Noble metal amount (g/L) | |
| --- | --- | --- | --- | --- |
|  |  |  | Pd | Rh |
| Example 1 | 10.05 | 6.7 | 1.00 | — |
| Example 2 | 20.10 | 13.4 | 1.00 | — |

TABLE 1-continued

|  | Ceria amount (g/L) | Ceria content (%) | Noble metal amount (g/L) | |
|---|---|---|---|---|
|  |  |  | Pd | Rh |
| Example 3 | 30.00 | 20.0 | 1.00 | — |
| Example 4 | 40.05 | 26.7 | 1.00 | — |
| Example 5 | 60.00 | 40.0 | 1.00 | — |
| Comparative Example 1 | 0.00 | 0.0 | 1.00 | — |
| Comparative Example 2 | 20.10 | 13.4 | 1.50 | 0.15 |

Test Example 1

Each catalyst (sample) obtained in Examples 1 to 5 and Comparative Examples 1 and 2 was switched between an air atmosphere and a nitrogen atmosphere every 30 minute in an electric furnace, and was subjected to accelerated aging at 900° C. for 10 hrs. Then, a catalyst performance evaluation test related to durability was done on the following condition using an exhaust model gas evaluation device ("MEXA9100, SIGU2000," manufactured by HORIBA Ltd.).

Catalyst Volume: 0.0754 L

Next, each catalyst (sample) on which the evaluation test was done was incorporated into the following evaluation vehicle, and amounts of emission of CO, THC, and NOx were measured.

Based on an exhaust gas emission amount when no catalyst was mounted, a conversion rate was calculated from the exhaust gas emission amount reduced by mounting each catalyst, and was shown in Table 2.

Figure 2:
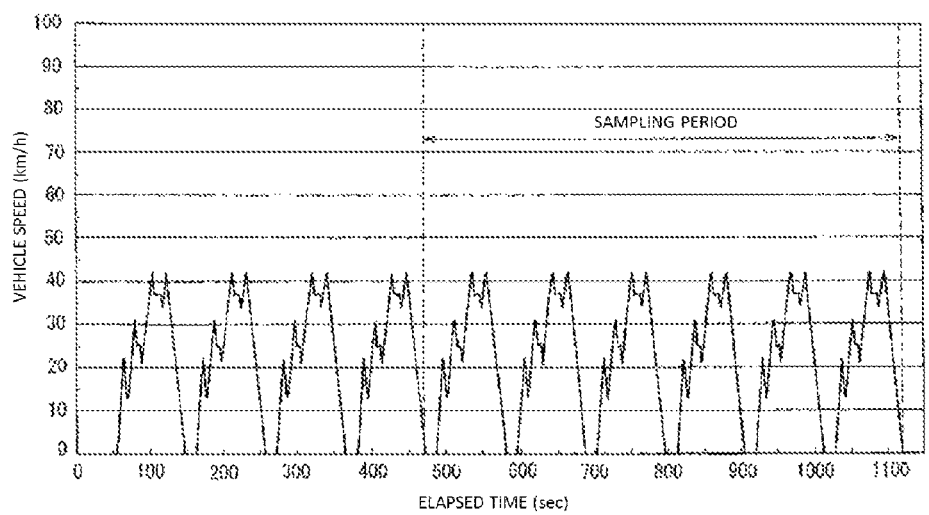
FIG. 2 is a diagram illustrating a driving pattern in the case of incorporating a catalyst (sample) into a vehicle and carrying out a driving test in Test Example 1 to be described below.

Vehicle used: Single cylinder 125cc-powered two-wheeled vehicle Fuel: Lead-free gasoline Driving Mode: IDC Mode Here, the term "IDC mode" refers to an exhaust gas emission amount evaluation mode established by the India's government, and a driving pattern described in FIG. 2.

Further, the term "Hot conversion rate" described in Table 2 refers to a value calculated based on the exhaust gas emission amount during a driving cycle after Cold.

TABLE 2

|  | Conversion rate (%) | | |
|---|---|---|---|
|  | CO | THC | $NO_x$ |
| Example 1 | 77.9 | 56.0 | 4.6 |
| Example 2 | 77.3 | 57.3 | 11.0 |
| Example 3 | 78.3 | 57.7 | 10.1 |
| Example 4 | 81.2 | 58.0 | 5.7 |
| Example 5 | 81.6 | 57.9 | 5.4 |
| Comparative Example 1 | 72.6 | 52.9 | 7.8 |
| Comparative Example 2 | 79.5 | 58.1 | 7.8 |

Table 2 showed a tendency that, in the Pd monolayer catalysts of Examples 1 to 5 and Comparative Example 1, as a percentage of the ceria amount in the catalyst layer increased, the conversion rates of CO and THC were improved.

Further, in the case of comparison with the Pd/Rh catalyst of Comparative Example 2, the conversion rates of CO and THC were roughly equal in Examples 4 and 5.

Test Example 2

The Pd monolayer catalyst obtained in Example 5 and the Pd/Rh catalyst obtained in Comparative Example 2 were each mounted on a motorcycle on which the exhaust gas purification device shown in FIG. 1 was mounted and subjected to a real vehicle endurance test.

The results were shown in Table 3 below.

TABLE 3

|  |  | CO | $NO_x$ |
|---|---|---|---|
| Example 5 | Initial value | 89.09 | −1.77 |
|  | After real driving endurance | 74.32 | 6.95 |
|  | Change rate | 0.834 | −3.92 |
| Comparative Example 2 | Initial value | 86.34 | 10.08 |
|  | After real driving endurance | 77.47 | 15.28 |
|  | Change rate | 0.897 | 1.52 |

(Considerations)

Referring to Table 3, in comparison with the Pd/Rh catalyst obtained in Comparative Example 2, the Pd monolayer catalyst obtained in Example 5 obtained the result that the CO conversion rate was stabilized as the durable distance increased, and finally the CO conversion rate was higher than that of Comparative Example 2. In other words, it was found that an amount of Pd could be reduced without using Rh by using the Pd monolayer catalyst of the invention.

EXPLANATIONS OF LETTERS OR NUMERALS

10: exhaust gas purification device
11: air cleaner
11A: air cleaner case
11C: dirty side (open air introduction chamber)
11D: clean side (clean air chamber)
11F: filter element
12: engine
13: carburetor
14: exhaust pipe
15: exhaust muffler
20: secondary air supply system
30: exhaust gas purification catalyst

The invention claimed is:

1. An exhaust gas purification device for a saddle-riding-type vehicle comprising:
   a carburetor;
   an air cleaner configured to have clean and dirty sides connected to the carburetor, to purify air suctioned from an outside to the dirty side, and to supply the purified air to an engine via the clean side;
   a secondary air supply system configured to supply secondary air for an exhaust port side of the engine from the clean side of the air cleaner; and
   an exhaust muffler connected to the engine via an exhaust pipe,
   wherein a palladium monolayer catalyst, in which a catalyst layer having the form of a monolayer containing palladium acting as a single catalyst active component, an inorganic porous body acting as a catalyst carrier, ceria ($CeO_2$) particles acting as a single promoter component, and barium is formed on a substrate, is disposed inside the exhaust muffler, and the palladium is carried on the ceria ($CeO_2$) particles; and the palladium is contained at a rate of 0.003 to 2 mass parts based on 100 mass parts of the catalyst layer.

2. The exhaust gas purification device for a saddle-riding-type vehicle according to claim 1, wherein the palladium monolayer catalyst contains the ceria particles at a rate of 15 to 50 parts by mass based on 100 parts by mass of the catalyst layer.

3. The exhaust gas purification device for a saddle-riding-type vehicle according to claim 1, wherein the palladium monolayer catalyst contains the catalyst layer of 40 g to 300 g per 1 liter substrate.

4. The exhaust gas purification device for a saddle-riding-type vehicle according to claim 2, wherein the palladium monolayer catalyst contains the catalyst layer of 40 g to 300 g per 1 liter substrate.

5. The exhaust gas purification device for a saddle-riding-type vehicle according to claim 1, further comprising a structure that divides the catalyst into two pieces by providing a separator at an inlet side of the catalyst and causes a turn flow at the other end by a hemispherical cap.

6. The exhaust gas purification device for a saddle-riding-type vehicle according to claim 2, further comprising a structure that divides the catalyst into two pieces by providing a separator at an inlet side of the catalyst and causes a turn flow at the other end by a hemispherical cap.

* * * * *